(12) United States Patent
Yao

(10) Patent No.: US 10,877,706 B2
(45) Date of Patent: Dec. 29, 2020

(54) PRINTING PROCESSING METHOD, DEVICE, PRINTING END, LOGISTICS PLATFORM, AND SERVER

(71) Applicant: CAINIAO SMART LOGISTICS HOLDING LIMITED, Grand Cayman (KY)

(72) Inventor: Xingrui Yao, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 0 days.

(21) Appl. No.: 16/564,207

(22) Filed: Sep. 9, 2019

(65) Prior Publication Data

US 2020/0004480 A1 Jan. 2, 2020

Related U.S. Application Data

(63) Continuation of application No. PCT/CN2018/077350, filed on Feb. 27, 2018.

(30) Foreign Application Priority Data

Mar. 10, 2017 (CN) .......................... 2017 1 0142873

(51) Int. Cl.
*G06F 3/12* (2006.01)
(52) U.S. Cl.
CPC .......... *G06F 3/1238* (2013.01); *G06F 3/1222* (2013.01); *G06F 3/1257* (2013.01)

(58) Field of Classification Search
CPC .... G06F 3/1238; G06F 3/1222; G06F 3/1257; G06F 3/1288; G06F 3/1243;
(Continued)

(56) References Cited

U.S. PATENT DOCUMENTS 5,963,925 A 10/1999 Kolling et al.
6,356,905 B1 3/2002 Gershman et al.
(Continued)

FOREIGN PATENT DOCUMENTS

CN 1208484 A 2/1999
CN 101663679 A 3/2010
(Continued)

OTHER PUBLICATIONS econd Office Action dated Jan. 20, 2020, issued in related Chinese Application No. 201710142873.X with English machine translation (14 pages).
(Continued)

*Primary Examiner* — Juan M Guillermety
(74) *Attorney, Agent, or Firm* — Sheppard Mullin Richter & Hampton LLP

(57) ABSTRACT

Embodiments of the specification provide a print processing method, device, a printing terminal, a logistics platform, and a server. The method includes: receiving printing data comprising to-be-printed content and a storage address of a target printing template; downloading the target printing template according to the storage address of the target printing template; combining the target printing template and the to-be-printed content to generate a printing document; and printing the printing document.

17 Claims, 8 Drawing Sheets

(58) Field of Classification Search
CPC .... G06F 3/1205; G06F 3/1204; G06F 3/1287; G06F 3/12; G07F 17/42
See application file for complete search history.

(56) References Cited

U.S. PATENT DOCUMENTS

| | | | |
|---|---|---|---|
| 6,618,504 | B1 | 9/2003 | Yoshino |
| 6,886,028 | B1* | 4/2005 | Matsuyama ......... G06F 3/1288 358/1.15 |
| 8,019,634 | B2 | 9/2011 | Wegner et al. |
| 8,417,588 | B2 | 4/2013 | Ringl et al. |
| 9,114,645 | B2 | 8/2015 | Gerber |
| 10,319,173 | B2 | 6/2019 | Adelberg et al. |
| 2002/0188515 | A1 | 12/2002 | Nakata et al. |
| 2005/0021404 | A1 | 1/2005 | Schoder et al. |
| 2006/0119885 | A1* | 6/2006 | Jeon ..................... G06F 3/1288 358/1.15 |
| 2008/0126157 | A1 | 5/2008 | Rousso et al. |
| 2008/0222639 | A1 | 9/2008 | Stockton et al. |
| 2010/0076585 | A1 | 3/2010 | Mayer et al. |
| 2011/0282476 | A1 | 11/2011 | Hegemier et al. |
| 2012/0047079 | A1 | 2/2012 | Biesemann et al. |
| 2012/0268778 | A1* | 10/2012 | Nakawaki ............ G06F 3/1288 358/1.15 |
| 2013/0103677 | A1* | 4/2013 | Chakra ................ G06F 16/248 707/723 |
| 2015/0103370 | A1* | 4/2015 | Takigawa ............. G06F 3/1238 358/1.14 |
| 2015/0271348 | A1* | 9/2015 | Kimura ................ G06F 3/1238 358/474 |
| 2017/0046105 | A1* | 2/2017 | Masui ................... G06F 3/1238 |

FOREIGN PATENT DOCUMENTS

| | | |
|---|---|---|
| CN | 103257890 A | 8/2013 |
| CN | 104636093 A | 5/2015 |
| CN | 104731536 A | 6/2015 |
| CN | 105573684 A | 5/2016 |
| EP | 1916620 A1 | 4/2008 |
| JP | 3922894 B2 | 5/2007 |
| WO | 2001063449 A2 | 8/2001 |

OTHER PUBLICATIONS

PCT International Preliminary Report on Patentability dated Sep. 19, 2019, issued in related International Application No. PCT/CN2018/077350, with English machine translation (9 pages).

PCT International Search Report and the Written Opinion dated May 30, 2018, issued in related International Application No. PCT/CN2018/077350 (8 pages).

First Search dated May 27, 2019, issued in related Chinese Application No. 201710142873.X (1 page).

First Office Action dated Jun. 3, 2019, issued in related Chinese Application No. 201710142873.X, with English machine translation (12 pages).

* cited by examiner

PRINTING PROCESSING METHOD, DEVICE, PRINTING END, LOGISTICS PLATFORM, AND SERVER

CROSS-REFERENCE TO RELATED APPLICATIONS

The present application is a continuation application of International Patent Application No. PCT/CN2018/077350, filed on Feb. 27, 2018, which is based on and claims priority to the Chinese Patent Application No. 201710142873.X, entitled "PRINTING PROCESSING METHOD, DEVICE, PRINTING END, LOGISTICS PLATFORM, AND SERVER" and filed on Mar. 10, 2017. The above-referenced applications are incorporated herein by reference in their entirety.

TECHNICAL FIELD

The application relates to the field of Internet technologies, and in particular, to a print processing method, a print processing device, a printing terminal, a logistics platform, and a server.

BACKGROUND

With the development of Internet technologies, printing devices become increasingly intelligent and can largely facilitate people's lives, study, and work.

For example, cloud printing technologies may be used on an e-commerce (EC) platform. A waybill document is generated on a cloud. The waybill document is delivered to a warehouse via a network. The warehouse then downloads the waybill document, opens the waybill document, and finally prints the waybill document by using a connected printing device. The waybill document is also referred to as a courier waybill, and is a document used to record related information such as a shipper, a receiver, and a product weight and price during delivery of goods in the delivery industry.

Generally, logistics providers that cooperate with EC platforms are from different logistics companies. These logistics companies have various courier waybill styles, resulting in a complex process of designing courier waybills. At present, courier waybills are usually designed by warehouses. For example, the styles the courier waybill provided by different logistics companies need to be adopted and corresponding programs need to be written by using a computer language to design different waybill templates for the different logistics companies. Therefore, design cost is high, and design efficiency is low. A warehouse is to detect a waybill template and assemble content on a waybill for a courier, resulting in extremely low efficiency and a complex printing process.

SUMMARY

Embodiments of the specification provide a print processing method, to resolve the problem of low efficiency in existing printing technologies. Correspondingly, embodiments of the specification further provide a print processing apparatus, a printing terminal, a logistics platform, and a server, to facilitate the implementation and application of the foregoing method.

To resolve the foregoing problem, embodiments of the specification provide a print processing method, applicable to a printing terminal, and including: receiving printing data comprising to-be-printed content and a storage address of a target printing template; downloading the target printing template according to the storage address of the target printing template; combining the target printing template and the to-be-printed content to generate a printing document; and printing the printing document.

In some embodiments, the method further comprises: sending a download request for a printing plug-in to a logistics platform; receiving a plug-in installation file from the logistics platform; and installing the printing plug-in by using the plug-in installation file.

In some embodiments, the method further comprises: connecting a printing plug-in; and receiving printing data comprises: receiving the printing data from a logistics platform by using the connected printing plug-in.

In some embodiments, the printing data is encrypted by the logistics platform; and before downloading the target printing template according to the storage address of the target printing template, the method further comprises: invoking the printing plug-in to decrypt the printing data to obtain the to-be-printed content and storage address of the target printing template.

In some embodiments, downloading the target printing template according to the storage address of the target printing template comprises: sending a template request to a template storage server by using the printing plug-in, the template request including the storage address of the target printing template; and receiving the target printing template corresponding to the storage address from the template storage server in response to the template request.

In some embodiments, the printing plug-in is configured to combine the target printing template and the to-be-printed content to form the printing document.

In some embodiments, the method further comprises: receiving a printing query request with respect to the printing document; and sending, in response to the printing query request, a printing result with respect to the printing document.

In some embodiments, the target printing template is configured to determine a style of the printing document to determine printing positions corresponding to the to-be-printed content.

Embodiments of the specification further provide a print processing method, applicable to a logistics platform, and including: providing one or more printing templates, a template identifier associated with each of the one or more printing templates, and a printing template storage address and a printing terminal identification (ID) that are associated with the template identifier; in response to receiving printing information, determining to-be-printed content and a target template identifier according to the printing information; determining a target printing terminal and a storage address of a target printing template according to the target template identifier; generating printing data according to the to-be-printed content and the storage address of the target printing template; and sending the printing data to the target printing terminal.

In some embodiments, the method further comprises: receiving a download request for a printing plug-in from the target printing terminal; sending a plug-in installation file for installation of the printing plug-in to the target printing terminal in response to the download request.

In some embodiments, the printing plug-in is configured to combine the target printing template and the to-be-printed content to form a printing document.

In some embodiments, generating printing data according to the to-be-printed content and the storage address of the target printing template comprises: encrypting the to-be-printed content and the target printing template storage address according to an encryption protocol of the printing plug-in to generate the printing data.

In some embodiments, the method further comprises: generating a printing template and a template identifier according to a template style document uploaded by a printing terminal; and uploading the printing template to a template storage server for storage, and determining a storage address of the printing template.

In some embodiments, a format of the template style document comprises an office software document format.

In some embodiments, the target printing template is configured to determine a style of a printing document to determine printing positions corresponding to the to-be-printed content.

Embodiments of the specification further provide a print processing apparatus comprising: one or more processors and one or more non-transitory computer-readable memories coupled to the one or more processors and configured with instructions executable by the one or more processors to cause the system to perform operations comprising: receiving printing data comprising to-be-printed content and a storage address of a target printing template; downloading the target printing template according to the storage address of the target printing template; combining the target printing template and the to-be-printed content to generate a printing document; and printing the printing document.

The embodiments of the specification include the following advantages. In the embodiments of the specification, a printing document is broken down into two parts, namely, a printing template and content to be printed. The printing template is stored in advance on a template storage server. Therefore, when printing is to be performed, printing data may be generated according to content to be printed and a storage address of a target printing template. The printing data is sent to a printing terminal. After receiving the printing data, the printing terminal may download the target printing template from the template storage server according to the storage address in the printing data, so as to combine the target printing template and the content to form a printing document. The printing terminal does not need to detect a printing template. That is, the printing terminal does not need to recognize a corresponding printing template according to content to be printed, and also does not need to assemble the content to be printed, thereby simplifying the printing process and improving printing efficiency.

DETAILED DESCRIPTION

Figure 1:
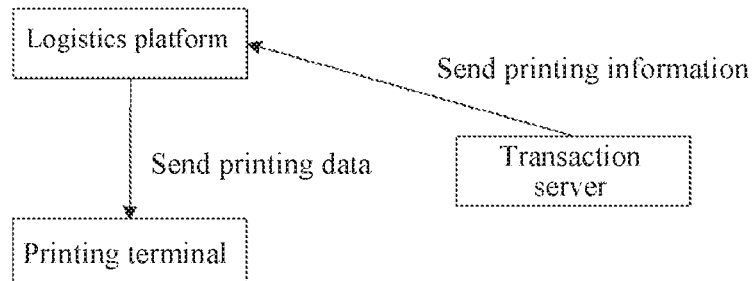
FIG. 1 is a schematic diagram of a print processing system according to some embodiments of the specification.

To make the foregoing objectives, features, and advantages of the specification more comprehensible, the specification is further described below in detail with reference to the accompanying drawings and embodiments.

In cloud printing, printing device resources are integrated based on the Internet to construct a roaming and shared printing platform that provides the entire society with printing businesses with standard quality anywhere and anytime.

In the embodiments of the specification, a printing document may be broken down into two parts, namely, a printing template and content to be printed. The printing template is stored in advance on a template storage server. Therefore, when printing is to be performed, printing data may be generated according to content to be printed and a storage address of a target printing template. The printing data is sent to a printing terminal. After receiving the printing data, the printing terminal may download the target printing template from the template storage server according to the storage address in the printing data, so as to combine the target printing template and the content to form a printing document. The printing terminal may not need to detect a printing template. That is, the printing terminal may not need to recognize a corresponding printing template according to content to be printed, and also does not need to assemble the content to be printed, thereby simplifying the printing process and improving printing efficiency.

In some embodiments, the printing data is generated by a logistics management platform. The printing data includes the content and the storage address of the target printing template. The printing document in the embodiments of the specification is a document obtained by the printing terminal through combining the content and the target printing template in the printing data.

In some embodiments, the target printing template may refer to a printing template that currently is to be used. A template identifier associated with the target printing template may be referred to as a target template identifier, and a storage address of the target printing template may be referred to as a target printing template storage address.

In some embodiments, the printing terminal may include local devices that perform printing. For example, the printing terminal may include a warehouse's central server, a terminal device, a printer, and the like of a logistics company. The terminal device may be a device having a multimedia function. Such a device may support an audio function, a video function, a data-related function, and the like. For example, the terminal device may be a smart mobile printing terminal such as a smartphone, a tablet computer or a smart wearable device that has a touchscreen or may be a device such as a smart TV or a personal computer that has a touchscreen. The terminal device may be connected to another device (for example, connected to the warehouse's central server or the printer) wirelessly or in a wired manner to perform data transmission with the other device, for example, receiving and/or sending data.

FIG. 1 is a schematic diagram of a print processing system according to some embodiments of the specification. As shown in FIG. 1, the print processing system may include: a logistics platform, a transaction server, and a printing terminal. The logistics platform may be a server or a server cluster, and may provide one or more printing templates, a template identifier associated with each of the printing templates, and a printing template storage address and a printing terminal ID that correspond to the template identifier. The printing template storage address may be used to download a corresponding printing template from a template storage server. The template storage server may be configured to store the printing templates, and for example, may be a cloud server. The printing terminal ID may be configured to uniquely identify the printing terminal.

In some embodiments, the transaction server may upload printing information to the logistics platform to trigger the logistics platform to generate printing data according to the printing information and send the printing data to a target printing terminal. The target printing terminal may be a printing terminal corresponding to a target template identifier. The printing information may include content to be printed. For example, the content to be printed may include some or all of information such as shipper information (for example, a shipper address, a contact number, and a shipper name), receiver information (for example, a receiver address, a contact number, and a receiver name), logistics company information (for example, a courier company name, and a courier waybill number), and additional information (for example, a product name, and remark information) on a courier waybill. In some embodiments, the printing information may further include the target template identifier. The target template identifier may be configured to determine a corresponding target printing template and the target printing terminal.

After receiving the printing information, the logistics platform may determine, according to the printing information, the content to be printed and the target template identifier. The logistics platform may also determine a target printing template storage address and the target printing terminal based on the target template identifier, and generate the printing data according to the content and the target printing template storage address. the logistics platform may therefore send the printing data to the target printing terminal to trigger the target printing terminal to perform printing according to the printing data. In some embodiments, when the printing information does not include the target template identifier, the logistics platform may determine a corresponding target template identifier according to the content to be printed. For example, the logistics platform may determine the target template identifier based on the courier company name or courier waybill number in the content.

After receiving the printing data, the target printing terminal may download the corresponding target printing template from the template storage server according to the target printing template storage address in the printing data. The target printing terminal may combine the target printing template and the content included in the printing data to generate a printing document, and therefore print the printing document. In some embodiments, the target printing terminal may include a central server and at least one terminal device connected to the central server. The target printing terminal may receive, via the central server, the printing data sent by the logistics platform, and may then send the printing data to a terminal device. A printing plug-in installed on the terminal device parses the printing data to obtain the target printing template storage address, and the target printing template may be downloaded based on the target printing template storage address. The to-be-printed content obtained after parsing and the target printing template are combined into the printing document. Therefore, a connected printer may print the printing document.

In some embodiments, business information to be printed may be determined as target business information. In different business fields, the business information may have different characteristics. The business information may be object information having a business field feature. For example, in the field of news media, the business information may be news information, for example, an article or a picture. In the field of mobile communications, the business information may be communication information, for example, a communication record, and may include a communication time, a communication number, and the like. In the field of EC, the business information may be order information, for example, a transaction order. Although carrying different field characteristics in different fields, the business information is essentially data, for example, text data, and image data. Correspondingly, print processing of the business information is essentially print processing of data.

Based on the foregoing print processing system, steps of a print processing method on each entity is respectively described below in detail.

Figure 2:
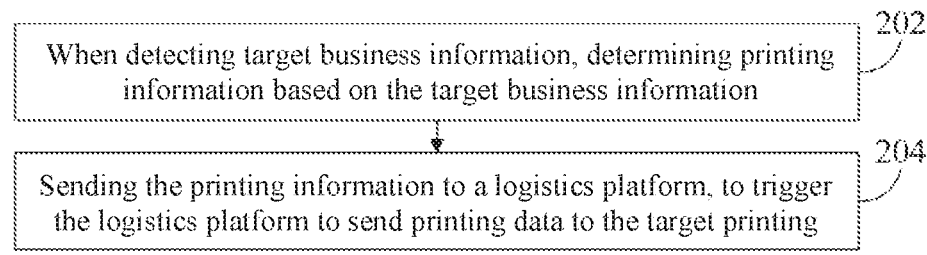
FIG. 2 is a flowchart of steps on a transaction server of a print processing method according to some embodiments of the specification.

FIG. 2 is a flowchart of steps on a transaction server of a print processing method according to some embodiments of the specification. As shown in FIG. 2, the method may include the following steps.

Step 202: When detecting target business information, determining printing information based on the target business information.

The printing information is configured to determine content to be printed and a target template identifier. The target template identifier is configured to determine a corresponding target printing template storage address and target printing terminal.

In some embodiments, when some information is to be printed, a user may enter corresponding content by using a terminal such as a mobile phone, a tablet computer, and a desktop computer to trigger the terminal to generate the corresponding target business information. The target business information may be sent to the transaction server, so that the transaction server may detect the target business information and determine printing information according to the target business information. The target business information includes the content entered by the user. The content may be configured to represent data that currently is to be printed, for example, content on a courier waybill.

For example, in the field of EC, after a user makes a transaction on an EC platform, the EC platform may generate order information according to information entered by a buyer and/or a seller of the transaction. The EC platform may be configured as a transaction server. When it is detected that delivery processing is to be performed for an order, the order information may be configured as the target business information, and content on a courier waybill corresponding to the order information may be determined as the content to be printed, so that it is convenient to manage cargo transportation of the order. For example, mail information in the order information may be determined as the content corresponding to the target business information, and may include contact information, cargo information, and/or the like. The contact information may include a receiver address, a shipper address, a receiver name, a shipper name, contact numbers, and the like. The cargo information may include: a cargo name or type, cargo weight, and the like.

In some embodiments, the transaction server may further generate a target template identifier according to the content entered by the user. For example, the transaction server may determine the target template identifier according to a courier company name chosen by the user or a courier waybill number in the order information; and may add the generated target template identifier to the printing information corresponding to the target business information.

For example, a correspondence between a courier company name and a template identifier in the content to be printed may be shown in the following Table 1.

TABLE 1

| | Courier company name | | | | |
|---|---|---|---|---|---|
| | Courier company 1 | Courier company 2 | Courier company 3 | ... | Courier company n |
| Template identifier | A1 | A2 | A3 | ... | An |

For example, if the courier company chosen by the user is "Courier company 1," the courier company name in the content is "Courier company 1." That is, the transaction server may add the template identifier "A1" as the target template identifier to the printing information, so that the printing information includes the target template identifier "A1." In another example, if the courier company chosen by the user is "Courier company 2," the courier company name in the content is "Courier company 2." That is, the transaction server may add the template identifier "A2" as the target template identifier to the printing information, so that the printing information includes the target template identifier "A2," where n may be an integer.

Step 204: Sending the printing information to a logistics platform, to trigger the logistics platform to send printing data to the target printing terminal.

The printing data is generated according to the content to be printed and the target printing template storage address. The target printing terminal is configured to print a printing document, and the printing document is obtained by combining a target printing template and the content.

In some embodiments, the target printing template may be configured to determine a style of the printing document, so as to determine printing positions corresponding to the content, e.g., a printing position for each piece of the content.

Figure 3:
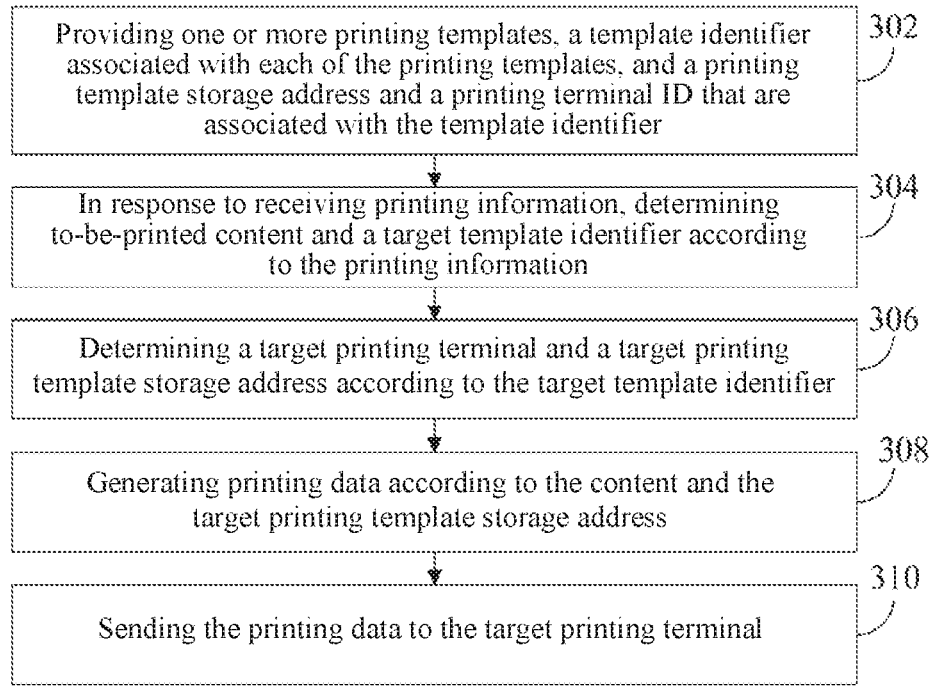
FIG. 3 is a flowchart of steps on a logistics platform of a print processing method according to some embodiments of the specification.

FIG. 3 is a flowchart of steps on a logistics platform of a print processing method according to some embodiments of the specification. As shown in FIG. 3, the method may include the following steps.

Step 302: Providing one or more printing templates, a template identifier associated with each of the printing templates, and a printing template storage address and a printing terminal ID that are associated with the template identifier.

In some embodiments, the logistics platform may store a template identifier associated with a printing template and an association between a template identifier and a printing template storage address and a printing terminal ID, for example, in a table.

For example, the association that is stored in the logistics platform and is between a template identifier and a printing template storage address and a printing terminal ID may be shown in the following Table 2.

When the template identifier is "An," the printing template storage address associated with the template identifier is "Storage address n," and the associated printing terminal ID is "IDn," where n may be an integer, for example, 1, 2, 3, etc. The printing template storage address may be a download link, for example, a Uniform Resource Locator (URL). The printing terminal ID may be configured to identify a printing terminal, for example, an Internet protocol (IP) address of the printing terminal.

TABLE 2

| | Template identifier | | | | |
|---|---|---|---|---|---|
| | A1 | A2 | A3 | ... | An |
| Printing template storage address | Storage address 1 | Storage address 2 | Storage address 3 | ... | Storage address n |
| Printing terminal ID | ID1 | ID2 | ID3 | ... | IDn |

Step 304: In response to receiving printing information, determining to-be-printed content and a target template identifier according to the printing information.

In some embodiments, after receiving the printing information sent by the transaction server, the logistics platform may determine content and the target template identifier according to the printing information, and acquire a target printing template storage address corresponding to the target template identifier. The target printing template storage address may be used to download a corresponding target printing template. The target printing template may be configured to determine a style of a printing document to determine printing positions of the content in a printed file.

In some embodiments, when the printing information includes content to be printed, after receiving the printing information, the logistics platform may parse the printing information to obtain the content included in the printing information, and determine a target template identifier based on the content. For example, when the content includes a courier company name, the target template identifier may be determined according to the courier company name. In some embodiments, the logistics platform may store a correspondence between a courier company name and a template identifier, as shown in the foregoing Table 1. When it is detected that the courier company name in the content is "Courier company n," the logistics platform may determine the template identifier "An" as the target template identifier.

In some embodiments, when the printing information includes the content to be printed and the target template identifier, after receiving the printing information, the logistics platform may parse the printing information to obtain the content and the target template identifier that are included in the printing information. For example, when the printing information includes the content to be printed and the target template identifier "An," the logistics platform may parse the printing information to obtain the content to be printed and the target template identifier "An."

Step 306: Determining a target printing terminal and a target printing template storage address according to the target template identifier.

In some embodiments, after determining the target template identifier, the logistics platform may determine a target printing terminal and a target printing template storage address according to the target template identifier. For example, the logistics platform may use the target template identifier as a keyword to search the foregoing Table 2, and find a printing template storage address associated with the target template identifier as the target printing template storage address. For example, the printing template storage address "Storage address n" associated with the target template identifier "An" is used as the target printing template storage address. The logistics platform may determine the target printing terminal based on the printing terminal ID associated with the target template identifier. For example, when the target template identifier is the template identifier "An," the printing terminal corresponding to the printing terminal ID "IDn" is determined as the target printing terminal.

Step 308: Generating printing data according to the content and the target printing template storage address.

After determining the target printing template storage address, the logistics platform may generate printing data based on the target printing template storage address and the content to be printed, so as to send the printing data to the target printing terminal to perform printing.

In some embodiments, the printing data may be encrypted data. For example, for secure data transmission, the logistics platform may encrypt the content to be printed and/or the target printing template storage address according to a preset encryption protocol to generate encrypted printing data. The preset encryption protocol may be an encryption protocol of a printing plug-in.

In some embodiments, generating printing data according to the content and the target printing template storage address may include: encrypting the content and the target printing template storage address according to the encryption protocol of the printing plug-in to generate the printing data. In some embodiments, after determining the target printing template storage address, the logistics platform may combine and encrypt the target printing template storage address and the content according to the encryption protocol of the printing plug-in to form the encrypted printing data.

In some embodiments, the printing plug-in may be configured to decrypt the encrypted printing data to obtain the decrypted content and target printing template storage address of the printing template. The printing plug-in can rapidly combine the content to be printed and the printing template to form the printing document. For example, the printing plug-in may be an Agent plug-in. The encryption protocol of the printing plug-in may include an Agent protocol.

With reference to the foregoing examples, in the field of EC, a logistics information platform may be used as the logistics platform. The logistics information platform may provide information businesses for logistics suppliers and users, and may include a website that can support or perform interaction or exchange of supply and demand information of logistics businesses. After receiving the printing information (for example, content on a courier waybill) delivered by an EC platform, the logistics information platform may determine a target printing template storage address according to the template identifier (for example, a courier number and a courier company name) in the printing information. For example, the logistics information platform may determine a storage address of a courier waybill template of a logistics company. After determining the storage address of the courier waybill template, the logistics information platform may acquire a URL of the courier waybill template from a template storage server; or acquire a URL of the courier waybill template from locally stored information, for example, Table 2. Therefore, the URL of the courier waybill template and the content on the courier waybill may be combined and encrypted according to the Agent protocol to form an encrypted character string, which may be an example of the printing data.

Step 310: Sending the printing data to the target printing terminal.

In some embodiments, after generating the printing data, the logistics platform may send the printing data to the target printing terminal. For example, the logistics platform may send the generated printing data to the target printing terminal according to the printing terminal ID associated with the target template identifier, so that the target printing terminal may receive the printing data. In some embodiments, when the printing data is encrypted data, the printing plug-in downloaded from the logistics platform may be installed in advance on the target printing terminal, so that the printing plug-in may decrypt the received printing data to obtain the decrypted content and target printing template storage address. Therefore the corresponding target printing template may be downloaded according to the target printing template storage address and combined with the content to form the printing document for printing.

Figure 4:
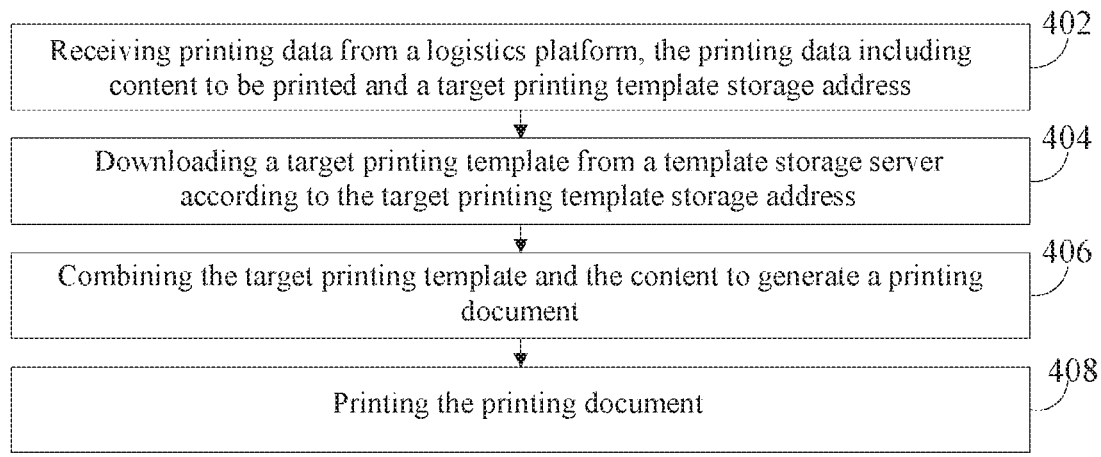
FIG. 4 is a flowchart of steps on a printing terminal of a print processing method according to some embodiments of the specification.

FIG. 4 is a flowchart of steps on a printing terminal of a print processing method according to some embodiments of the specification. As shown in FIG. 4, the method may include the following steps.

Step 402: Receiving printing data from a logistics platform, the printing data including content to be printed and a target printing template storage address.

In some embodiments, the printing terminal includes at least one central server, one or more terminal devices connected to the central server, and a printer connected to any of the terminal devices. The central server may receive the printing data sent by the logistics platform. For example, the central server may receive, via a gateway, the printing data sent by the logistics platform. After receiving the printing data, the central server may forward the printing data to a terminal device, so as to trigger the terminal device to perform printing according to the printing data.

Step 404: Downloading a target printing template from a template storage server according to the target printing template storage address.

The template storage server is configured to store printing templates. After receiving the printing data forwarded by the central server, the terminal device in the printing terminal may parse the printing data to obtain the target printing template storage address and the content to be printed, and download a target printing template from the template storage server according to the target printing template storage address.

In some embodiments, when the printing data is generated through encryption by the logistics platform, before downloading a target printing template from a template storage server according to the target printing template storage address, the method further includes: invoking a printing plug-in to decrypt the printing data to obtain the content and the target printing template storage address.

In some embodiments, the printing data is obtained through encryption performed by the logistics platform according to an encryption protocol of the printing plug-in. Therefore, the printing plug-in is configured to decrypt the printing data, so as to improve the security of the printing data. In some embodiments, the printing plug-in provided by the logistics platform may be installed on the terminal device in the printing terminal and decrypt the received printing data to obtain the decrypted content and the target printing template storage address.

In some embodiments, the print processing method further includes: connecting the installed printing plug-in. Receiving printing data from a logistics platform may include: receiving, by using the connected printing plug-in, the printing data sent by the logistics platform.

In some embodiments, if the logistics platform requires that the terminal device in the printing terminal is to use the printing plug-in to receive the printing data, the printing plug-in provided by the logistics platform may be installed in advance on the terminal device in the printing terminal, so that the printing plug-in may be configured to receive the printing data and decrypt the printing data.

In some embodiments, after the terminal device in the printing terminal receives the printing data, if currently the printing plug-in provided by the logistics platform has not been installed, the printing plug-in provided by the logistics platform may be installed first, and the currently installed printing plug-in is then invoked to decrypt the printing data. If currently the printing plug-in provided by the logistics platform is installed, the installed printing plug-in may be invoked to decrypt the printing data.

In some embodiments, the print processing method may further include: when the printing plug-in is not installed, sending a download request for a printing plug-in to the logistics platform; receiving a plug-in installation file, the plug-in installation file being an installation file fed back by the logistics platform in response to the plug-in download request; and installing the printing plug-in by using the plug-in installation file.

In some embodiments, when the printing plug-in is not installed on the terminal device in the printing terminal, the download request for the printing plug-in may be sent to the logistics platform via a network connection to request to download the printing plug-in from the logistics platform.

The logistics platform may receive the download request for a printing plug-in from the printing terminal; and after receiving the download request, may send the plug-in installation file to the printing terminal in response to the download request. That is, the logistics platform feeds back an installation file of the printing plug-in to the terminal device that requests to download the printing plug-in, so that the terminal device in the printing terminal may install the printing plug-in according to the installation file. The installation file may be configured to install the printing plug-in provided by the logistics platform.

After receiving the installation file fed back by the logistics platform in response to the download request for the printing plug-in, the terminal device in the printing terminal may install the printing plug-in by using the plug-in installation file, for example, executing an installation program in the installation file to install the printing plug-in.

Step 406: Combining the target printing template and the content to generate a printing document.

In some embodiments, printing templates are stored in advance on the template storage server. Therefore, after obtaining the target printing template storage address, the printing terminal may download a corresponding printing template from the template storage server according to the target printing template storage address, and the printing plug-in may combine the printing template and the decrypted content to form the printing document. The printing terminal does not need to detect a printing template. That is, the printing terminal does not need to recognize a corresponding printing template according to content to be printed, and also does not need to assemble the content to be printed, thereby simplifying the printing process and improving printing efficiency. For example, the printing terminal may acquire, from the template storage server and according to a URL of the printing template obtained after decryption, the printing template that is stored in advance, and the printing plug-in rapidly combines the printing template and the content to be printed to form the printing document.

In some embodiments, downloading a corresponding target printing template from a template storage server according to the target printing template storage address may include: sending a template request to the template storage server by using the printing plug-in, the template request including the target printing template storage address; receiving the target printing template fed back by the template storage server in response to the template request, the target printing template being a printing template corresponding to the target printing template storage address. In some embodiments, the terminal device in a target printing terminal may send the template request to the template storage server by using the printing plug-in, so as to acquire, from the template storage server, the target printing template corresponding to the target printing template storage address. The template request may include the target printing template storage address, for example, URL information of the target printing template. After receiving the template request, the template storage server may feedback the target printing template corresponding to the target printing template storage address included in the template request to the terminal device in the target printing terminal, so that the terminal device in the target printing terminal can receive the target printing template.

The target printing template may be configured to determine a style of the printing document, so as to determine printing positions of the content. The printing plug-in may be configured to combine the printing template and the content to form the corresponding printing document.

In some embodiments, the printing terminal may determine, by matching data format, printing positions of various pieces of the content in a target template, so that the various pieces of the content may be filled in the printing template according to the determined printing positions to form the printing document. For example, the terminal device in the target printing terminal may determine, in a character matching manner, that the receiver "Smith" in the content is to be filled as the characters "***" following "the receiver" in the target printing template. That is, after the filling, the characters following the receiver in the target printing template are "Smith." After the various pieces of the content have been filled in the target printing template, a printing document is formed.

Step 408: Printing the printing document.

In some embodiments, the terminal device in the target printing terminal may send a printing request to a printing device based on the printing document for the printing device to print the printing document. In some embodiments, the terminal device may be connected to the printing device, and send the printing request to the connected printing device based on the printing document that currently is to be printed, so as to trigger the printing device to print the printing document. In some embodiments, after receiving the printing request, the printing device may respond to the printing request to print the printing document.

The printing document may be formed by using the printing plug-in. The printing plug-in may protect the formed printing document and forbid the printing terminal from storing the printing document, so as to prevent the printing terminal from performing an unauthorized operation on the printing document. For example, the printing plug-in may prevent the printing terminal from transmitting the printing document to an unauthorized device to cause information leakage.

In some embodiments, the print processing method may further include: receiving a printing query request with respect to the printing document; and sending, in response to the printing query request, a printing result of the printing document. In some embodiments, a user may enter a printing query request in the terminal device in the printing terminal to check a printing result of the printing document. After receiving the printing query request for the printing document, the terminal device may feedback the corresponding printing result to the user, for example, by displaying the printing document to the user based on the printing query request. The printing result may be used to determine whether the printing document is successfully printed. In some embodiments, the printing result may be used to analyze a failure of printing the printing document. For example, the printing result may be used to check content to be printed and check the printing positions of the various pieces of the content.

Figure 5:
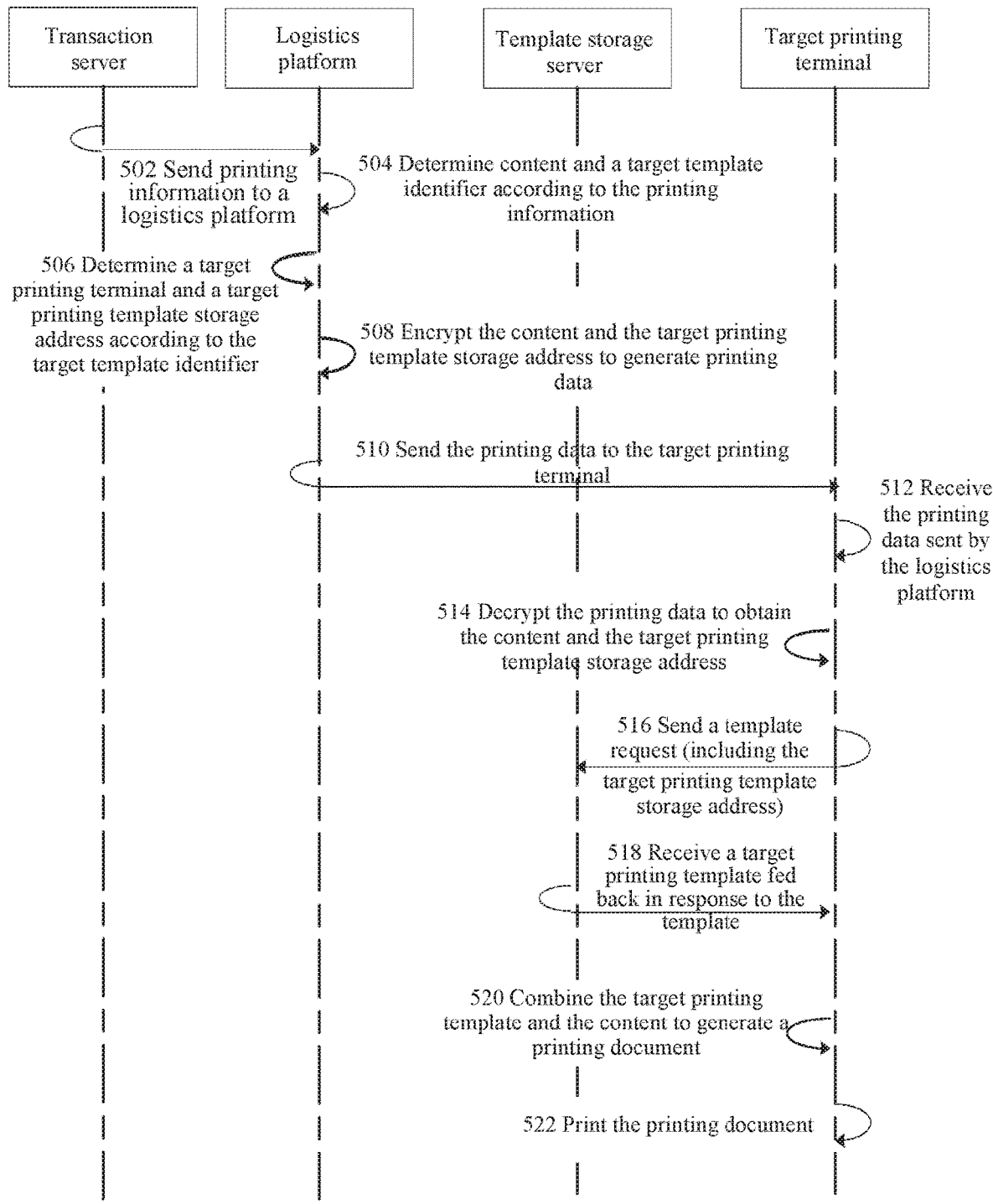
FIG. 5 is a schematic diagram of interaction among a transaction server, a logistics platform, a target printing terminal, and a template storage server in a print processing method according to some embodiments of the specification.

FIG. 5 is a schematic diagram of interaction among a transaction server, a logistics platform, a target printing terminal, and a template storage server in a print processing method according to some embodiments of the specification. The print processing method may include the following steps.

Step 502: The transaction server sends printing information corresponding to target business information to the logistics platform.

In some embodiments, when detecting the target business information, the transaction server determines the printing information corresponding to the target business information, and sends the printing information to the logistics platform, so as to trigger the logistics platform to send printing data to the target printing terminal. The printing information may include content to be printed and a target template identifier.

Step 504: After receiving the printing information, the logistics platform determines the content and the target template identifier according to the printing information.

Step 506: The logistics platform determines a target printing terminal and a target printing template storage address according to the target template identifier.

In some embodiments, the logistics platform may retrieve, from the printing information, the content to be printed and the target template identifier, and acquire a target printing template storage address according to the target template identifier. For example, the logistics platform may acquire, from the template storage server, the target printing template storage address associated with the target template identifier. The logistics platform may determine a target printing terminal according to the target template identifier. For example, the logistics platform may determine an IP address of a central server in the target printing terminal according to the target template identifier.

For example, after receiving content on a courier waybill sent by an EC platform configured as a transaction server, the logistics platform may determine the target template identifier of a courier waybill template according to a courier number or a courier company name in the content, and acquire, from the template storage server and based on the target template identifier, web address information of the waybill template associated with the target template identifier, for example, a URL of the waybill template generated according to a courier waybill style provided by a logistics company.

Step 508: The logistics platform encrypts the content and the target printing template storage address according to an encryption protocol of a printing plug-in to generate printing data.

Step 510: The logistics platform sends the printing data to the target printing terminal.

Step 512: The target printing terminal receives the printing data sent by the logistics platform.

Step 514: The target printing terminal invokes the printing plug-in to decrypt the printing data to obtain the content and the target printing template storage address.

Step 516: The target printing terminal sends a template request to the template storage server by using the printing plug-in, the template request including the target printing template storage address.

Step 518: The target printing terminal receives a target printing template fed back by the template storage server in response to the template request, the target printing template being a printing template corresponding to the target printing template storage address.

Step 520: The target printing terminal combines the target printing template and the content to generate a printing document.

Step 522: The target printing terminal prints the printing document.

In some embodiments, after receiving the printing data, a terminal device in a printing terminal may invoke the printing plug-in provided by the logistics platform to decrypt the printing data, combine the decrypted printing data, and form the printing document. A connected printing device prints the printing document.

In some embodiments, the print processing method may further include: generating, by the logistics platform, a printing template and a template identifier according to a template style document uploaded by the printing terminal; and uploading the printing template to the template storage server, so that the template storage server stores the printing template, and determining a storage address for the printing template. In some embodiments, a business entity such as a logistics company may enter, in the printing terminal, a template style document that the business entity is to use, for the printing terminal to upload the template style document to the logistics platform, so that the logistics platform may be triggered to generate the printing template and template identifier according to the template style document for the business entity. The template style document may be configured to determine a style of the printing template. The style may be used to specify positions of various pieces of the content to be printed in the printing template and/or determine formats of the various pieces of the content, for example, a font size and/or a font color of text, and a pixel range of a picture.

After receiving the template style document entered by the business entity, the logistics platform may generate, by using a computer language, the printing template corresponding to the template style document and a template identifier of the printing template. The logistics platform may upload the printing template to the template storage server via a network connection, so that the template storage server stores the printing template. The printing template is stored on the template storage server and may have a corresponding printing template storage address; and, the printing template storage address may be used to acquire the printing template.

In some embodiments, a format of the template style document may include, but is not limited to, a format of an office software document, for example, a Word format, a Microsoft Office PowerPoint (PPT) format, a Portable Document Format (PDF). For example, the business entity may use an office software document to edit a template style that the business entity is to use, and upload the edited template style document to the logistics platform by using the terminal device in the printing terminal, so as to complete the design of a template style for printing and to facilitate setting of a printing template corresponding to the business entity. Accordingly, the efficiency of designing printing templates can be improved and the costs of designing printing templates can be reduced.

Figure 6:
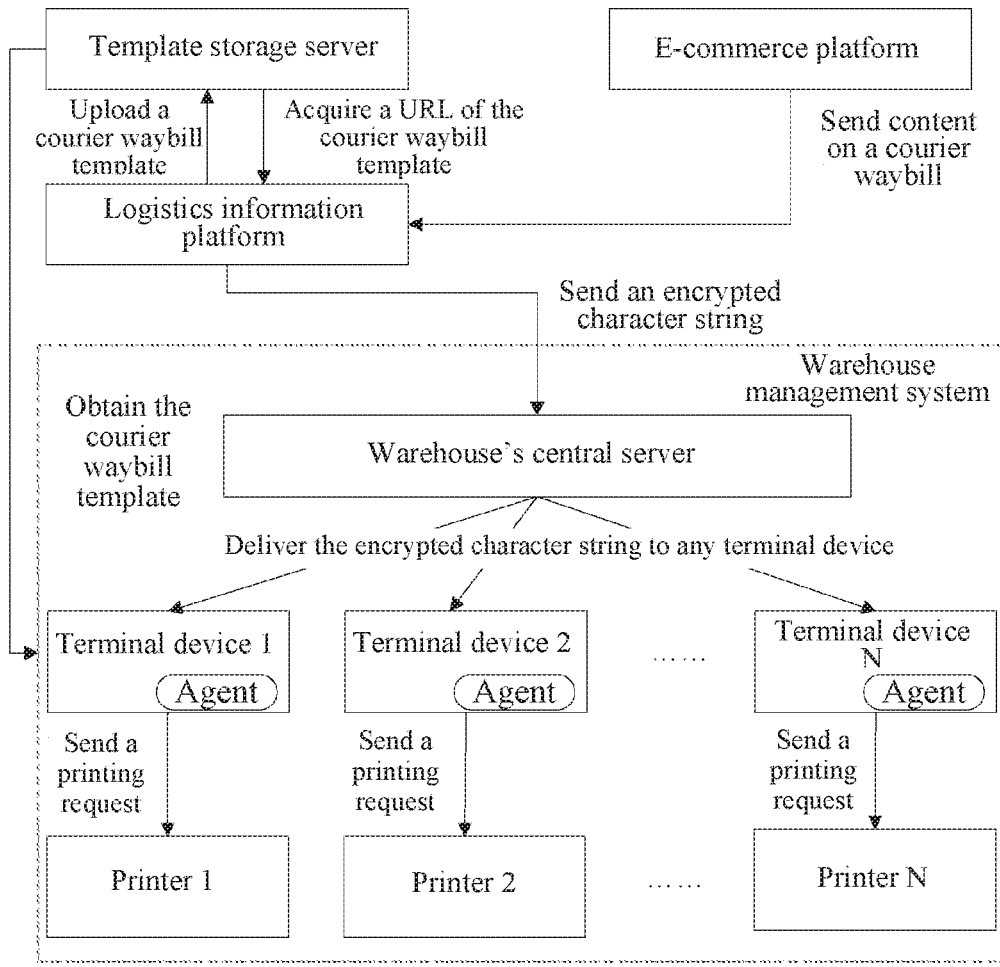
FIG. 6 is a schematic architectural diagram of an example of a print processing system according to the specification.

FIG. 6 is a schematic architectural diagram of an example of a print processing system according to the specification. As an application of the specification, in the field of EC, an EC platform may be configured as a transaction server, a logistics information platform may be configured as a logistics platform, and a warehouse management system of a logistics company may be configured as a target printing terminal. Moreover, a courier waybill template may be used as a printing template, content on a courier waybill may be used as the content to be printed, and the courier waybill may be used as a printing document.

In some embodiments, the logistics platform may design a courier waybill template in advance, and store the courier waybill template in a template storage server. For example, logistics providers that cooperate in cross-border EC are from various international logistics companies. The logistics platform may determine the logistics companies as business entities, and generate, according to a courier waybill style document provided by each logistics company and by using a computer language, a courier waybill template corresponding to each logistics company. The courier waybill template may have a unique template identifier. The template identifier may be configured to determine the courier waybill template and a printing terminal that correspond to the logistics company. For example, a barcode or a two-dimensional barcode is used to identify a courier waybill. The logistics platform may upload the courier waybill template to the template storage server for storage. That is, the courier waybill templates of the various international logistics companies may be arranged and stored on the template storage server. Cross-border EC is international commercial activity in which transaction entities from different customs territories use the EC platform to conduct transactions, make payment and settlement, and deliver commodities through cross-border logistics to complete transactions.

During delivery of a product, the EC platform may send to the logistics information platform content on a courier waybill corresponding to the product, so that the logistics information platform forwards printing data corresponding to the courier waybill to the warehouse management system of a logistics company. The warehouse management system may print the courier waybill according to the printing data. In some embodiments, the logistics information platform may acquire two parts of data, namely, a URL of a courier waybill template stored on the template storage server and the content on the courier waybill. The two parts of data may then be combined and encrypted according to an Agent protocol to generate an encrypted character string, that is, forming encrypted printing data. For example, the logistics information platform may acquire, via a cloud printing interface, the content on the courier waybill sent by the EC platform, and acquire the URL of the courier waybill template via an interface connecting the template storage server. Therefore, the URL of the courier waybill template and the content on the courier waybill may be encrypted according to the Agent protocol to generate the encrypted character string, and the encrypted character string may be sent to the warehouse management system via a network. For example, the encrypted character string is sent to a warehouse's central server via a gateway. The encrypted character string may be sent according to the shipper address in the content. For example, if the shipper address in the content is "XX Village, Beijing, China," the logistics platform may send the encrypted character string to the warehouse's central server located in Beijing, China. After receiving the encrypted character string, the warehouse's central server may deliver the encrypted character string to a terminal device connected to the warehouse's central server. For example, the encrypted character string is delivered to any terminal device in the warehouse management system, for example, to any one of a terminal device 1, a printing terminal device 2, . . . , a printing terminal device n, where n is an integer.

Figure 7:
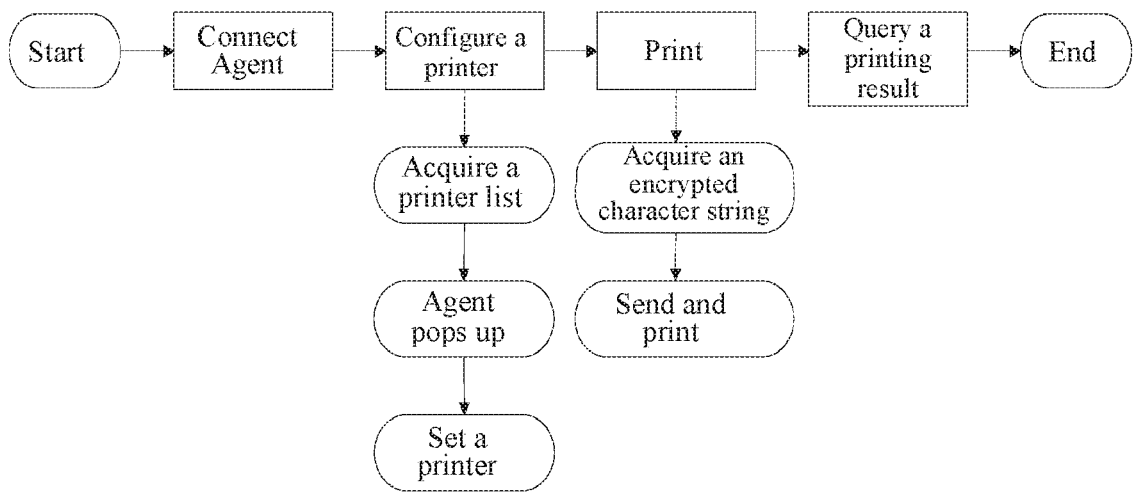
FIG. 7 is a schematic flowchart of a print processing method applicable to a printing terminal according to some embodiments of the specification.

FIG. 7 is a schematic flowchart of a print processing method applicable to a printing terminal according to some embodiments of the specification. As shown, after receiving an encrypted character string, a terminal device in a target printing terminal may send the encrypted character string to a printing plug-in Agent installed in advance, so that the printing plug-in Agent decrypts the encrypted character string and performs printing.

In some embodiments, the terminal device may be connected to the printing plug-in in advance, and a printer is configured in advance. For example, the terminal device may acquire a printer list and choose a printer on the printer list, such that the printing plug-in Agent pops up, and the printer can be set. For example, a connection relationship between the printing plug-in Agent and the chosen printer may be established, so that the chosen printer may print a printing document formed by the printing plug-in Agent. In this way, the printer has been set.

The terminal device may send the received encrypted character string to the printing plug-in Agent to perform printing, and query a printing result. For example, the terminal device may query a printing result according to a courier waybill number. Before printing, the printing plug-in Agent may acquire the encrypted character string, then decrypt the encrypted character string to obtain decrypted content and a URL of a courier waybill template, and generate, according to the decrypted content and the URL of the courier waybill template, a courier waybill that is to be printed. Finally, the connected printer may print the courier waybill. For example, a printing request is sent to the printer.

Figure 8:
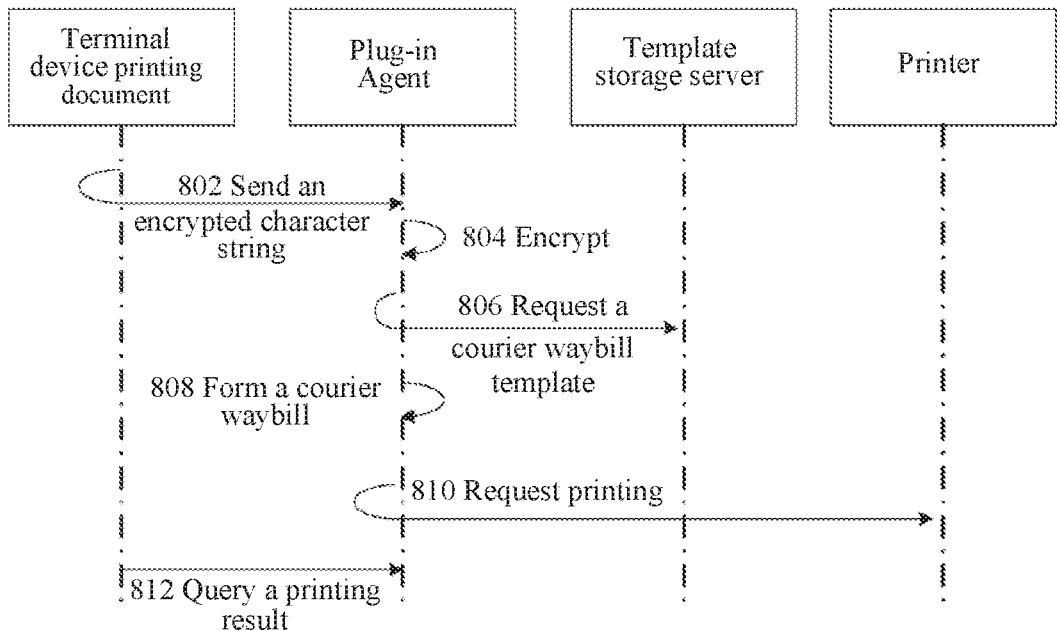
FIG. 8 is a schematic flowchart of a printing process of a printing plug-in "Agent" according to some embodiments of the specification.

FIG. 8 is a schematic flowchart of a printing process of a printing plug-in "Agent" according to some embodiments of the specification. As shown in FIG. 8, the printing process may include the following steps.

Step 802: A terminal device in a warehouse management system may send an encrypted character string to the printing plug-in Agent.

Step 804: After receiving the encrypted character string, the printing plug-in Agent may decrypt the encrypted character string.

Step 806: The printing plug-in Agent requests to download a courier waybill template.

In some embodiments, the printing plug-in Agent requests to obtain two parts of content after decryption, namely, a URL of a courier waybill template and content on a courier waybill. The printing plug-in Agent may request to download a template from a template storage server by using the URL of the courier waybill template. That is, the printing plug-in Agent may request to download the courier waybill template from the template storage server. For example, a network in a warehouse is usually a local area network, and a central server can be connected to an external network. An agent server may be installed on the central server, so that requests of each terminal device in the local area network can be forwarded to the external network. Therefore, when the printing plug-in Agent requests the courier waybill template, the central server may request to acquire the courier waybill from the template storage server.

Step 808: The printing plug-in Agent forms a courier waybill.

After the courier waybill template has been downloaded, the printing plug-in Agent may combine the downloaded courier waybill template and the content on the courier waybill, so that the corresponding courier waybill may be generated after the combination is completed.

Step 810: The printing plug-in Agent requests a printer to print the courier waybill. For example, the printing plug-in Agent sends a message of a printing request to the printer.

Step 812: The terminal device may send a request for querying a printing result to the printing plug-in Agent to query a printing result of the courier waybill. The request for querying a printing result may include a courier waybill number.

The method embodiments are illustrated as a series of action combinations for ease of description. However, a person skilled in the art should know that the embodiments of the specification are not limited to the described order of actions. Based on the embodiments of the specification, some steps may be performed in other orders or in parallel. In addition, a person skilled in the art should know that the embodiments described in the specification are some but not all embodiments, and the involved actions and modules are not necessarily required in the embodiments of the specification.

Figure 9:
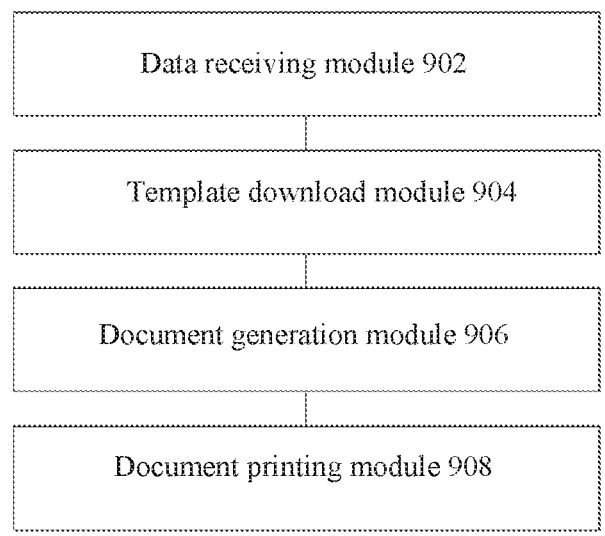
FIG. 9 is a structural block diagram of a print processing apparatus according to some embodiments of the specification.

FIG. 9 is a structural block diagram of a print processing apparatus according to some embodiments of the specification. The print processing device may be applicable to a printing terminal, and may include the following modules: a data receiving module 902, configured to receive printing data sent by a logistics platform, the printing data including content to be printed and a target printing template storage address; a template download module 904, configured to download a target printing template from a template storage server according to the target printing template storage address, the template storage server being configured to store printing templates; a document generation module 906, configured to combine the target printing template and the content to generate a printing document; and a document printing module 908, configured to print the printing document.

In some embodiments, the device further includes a plug-in connection module. The plug-in connection module is configured to connect an installed printing plug-in. The data receiving module 902 is configured to receive, by using the connected printing plug-in, the printing data sent by the logistics platform.

In some embodiments, the device further includes the following modules: a download request sending module configured to: when the printing plug-in is not installed, send a plug-in download request to the logistics platform; an installation file receiving module configured to receive a plug-in installation file, the plug-in installation file being an installation file fed back by the logistics platform in response to the plug-in download request; and a plug-in installation module configured to install the printing plug-in by using the plug-in installation file.

In some embodiments, the printing data is generated through encryption by the logistics platform, and the device further includes: a data decryption module, configured to invoke the printing plug-in to decrypt the printing data to obtain the content and the target printing template storage address.

In some embodiments, the template download module 904 may include the following submodules: a template request submodule configured to send a template request to the template storage server by using the printing plug-in, the template request including the target printing template storage address; a template receiving submodule configured to receive a printing template fed back by the template storage server in response to the template request, the fed-back printing template being a printing template corresponding to the target printing template storage address.

In some embodiments, the device may further include the following modules: a query request receiving module configured to receive a printing query request for the printing document; and a printing result feedback module configured to feedback, according to the printing query request, a printing result of the printing document.

In some embodiments, the target printing template is configured for determining a style of the printing document to determine printing positions of the content. The printing plug-in is configured to combine the target printing template and the content to form the printing document.

Figure 10:
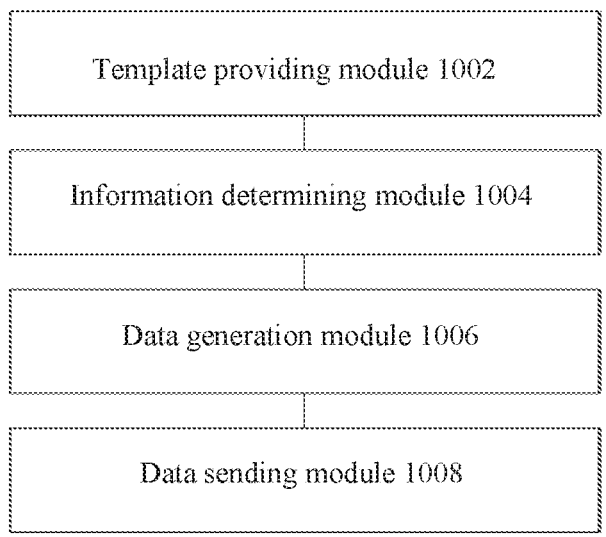
FIG. 10 is a structural block diagram of a print processing apparatus according to other embodiments of the specification.

FIG. 10 is a structural block diagram of a print processing apparatus according to other embodiments of the specification. The print processing device may be applicable to a logistics platform, and may include the following modules: a template providing module 1002 configured to provide one or more printing templates, a template identifier associated with each of the printing templates, and a printing template storage address and a printing terminal ID that are associated with the template identifier; an information determining module 1004 configured to: when printing information sent by a transaction server is received, determine a target printing terminal and a target printing template storage address according to the printing information; a data generation module 1006 configured to generate printing data according to the content and the target printing template storage address; and a data sending module 1008 configured to send the printing data to the target printing terminal.

In some embodiments, the device may further include the following modules: a download request receiving module configured to receive a plug-in download request sent by the target printing terminal; and an installation file sending module configured to send a plug-in installation file to the target printing terminal in response to the plug-in download request, the plug-in installation file being configured for installation of a printing plug-in.

In some embodiments, the data generation module is configured to encrypt the content and the target printing template storage address according to an encryption protocol of the printing plug-in to generate the printing data.

In some embodiments, the device may further include the following modules: a template generation module configured to generate the printing template and template identifier according to a template style document uploaded by a printing terminal; and a template upload module configured to: upload the printing template to a template storage server for storage, and determine the corresponding printing template storage address.

In some embodiments, a format of the template style document may include, but is not limited to, an office software document format. In some embodiments, the printing template is configured to determine a style of a printing document, so as to determine printing positions of the content. The printing plug-in is configured to combine the printing template and the content to form the printing document.

In some embodiments, a target printing template is configured for determining a style of the printing document to determine printing positions of the content. The printing plug-in is configured to combine the target printing template and the content to form the printing document.

Figure 11:
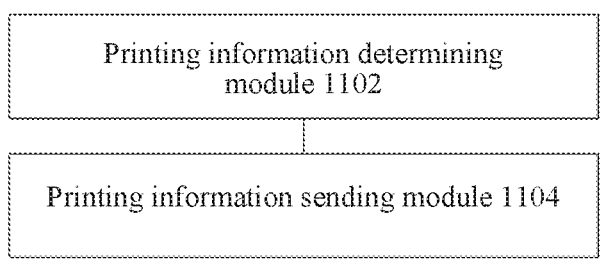
FIG. 11 is a structural block diagram of a print processing apparatus according to still other embodiments of the specification.

FIG. 11 is a structural block diagram of a print processing apparatus according to still other embodiments of the specification. The print processing device may be applicable to a transaction server, and may include the following modules: a printing information determining module 1102 configured to: when target business information is detected, determine printing information corresponding to the target business information, the printing information being configured to determine content to be printed and a target template identifier, and the target template identifier being configured to determine a corresponding target printing template storage address and target printing terminal; and a printing information sending module 1104 configured to: send the printing information to a logistics platform, to trigger the logistics platform to send printing data to the target printing terminal, the printing data being data being generated according to the content and the target printing template storage address, the target printing terminal being configured to print a printing document, and the printing document being obtained by combining a target printing template and the content.

In some embodiments, the target printing template is configured for determining a style of the printing document to determine printing positions of the content.

The device embodiments are basically similar to the method embodiments, and therefore are described relatively briefly. For related parts, refer to the descriptions of the method embodiments.

Figure 12:
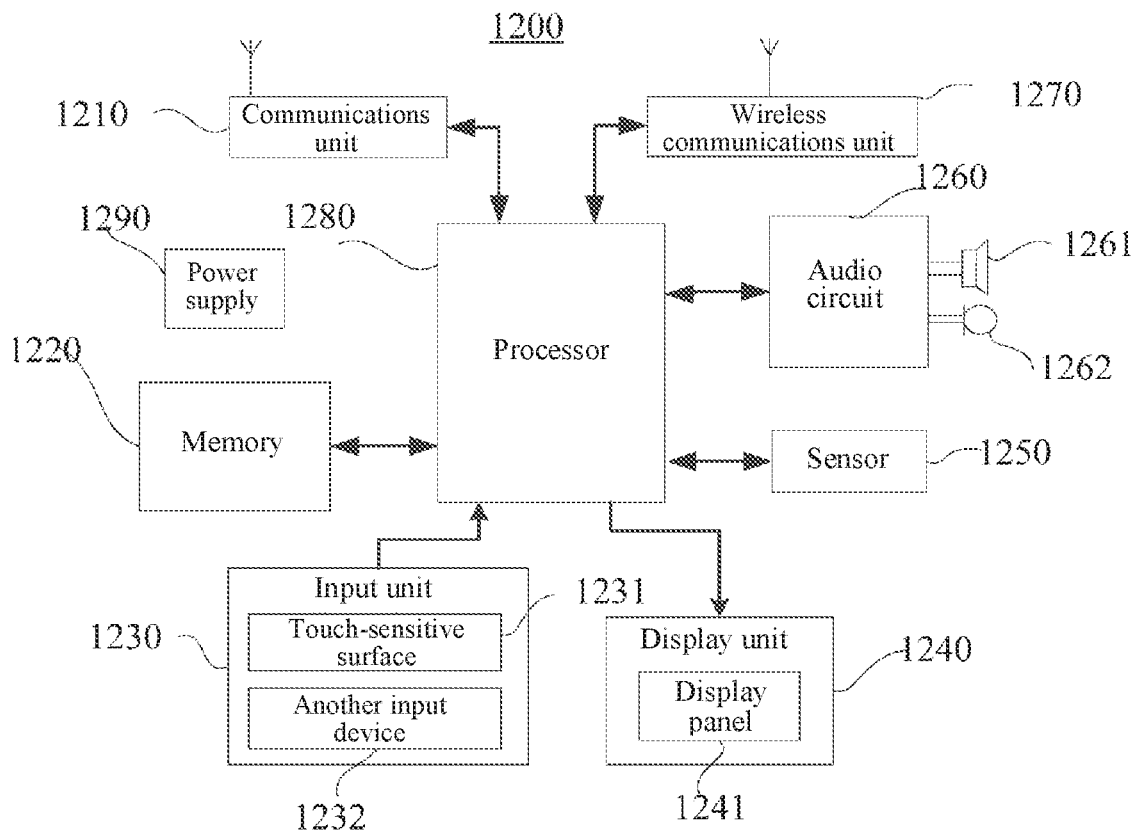
FIG. 12 is a schematic structural diagram of a printing terminal according to some embodiments of the specification.

FIG. 12 is a schematic structural diagram of a printing terminal according to some embodiments of the specification. As shown in FIG. 12, the printing terminal may be configured to implement the print processing method provided in the foregoing embodiments of the printing terminal. The printing terminal may include a terminal device, which may be, for example, a mobile phone, a tablet computer (pad), a wearable mobile device (for example, a smartwatch), a personal computer, and the like.

The printing terminal 1200 may include components such as a communications unit 1210, a memory 1220 including one or more computer readable storage media, an input unit 1230, a display unit 1240, a sensor 1250, an audio circuit 1260, a Wireless Fidelity (WiFi) module 1270, a processor 1280 including one or more processing cores, and a power supply 1290. A person skilled in the art can understand that the structure of the printing terminal shown in FIG. 12 does not constitute a limitation to the printing terminal, and the printing terminal may include more components or fewer components than those shown in the figure, or some components may be combined, or a different component deployment may be used.

The communications unit 1210 may be configured to receive and send signals during an information receiving and sending process or a call process. The communications unit 1210 may be a network communications device, such as a radio frequency (RF) circuit, a router, or a modem. For example, when the communications unit 1210 is the RF circuit, the communications unit receives downlink information from a base station, then delivers the downlink information to one or more processors 1280 for processing, and sends related uplink data to the base station. Generally, the RF circuit serving as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 1210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program required by at least one function (such as a sound playback function and an image display function), and the like. The data storage area may store data (such as audio data and an address book) created according to use of the printing terminal 1200, and the like. In addition, the memory 1220 may include a high speed random access memory, and may also include a non-volatile memory (NVM), such as at least one magnetic disk storage device, a flash memory, or another volatile solid-state storage device. Correspondingly, the memory 1220 may further include a memory controller, so as to provide access of the processor 1280 and the input unit 1230 to the memory 1220.

The input unit 1230 may be configured to receive input digit or character information, and generate a keyboard, mouse, joystick, optical, or track ball signal input related to the user setting and function control. In some embodiments, the input unit 1230 may include a touch-sensitive surface 1231 and another input device 1232. The touch-sensitive surface 1231, which may also be referred to as a touchscreen or a touch panel (TP), may collect a touch operation of a user on or near the touch-sensitive surface (such as an operation of a user on or near the touch-sensitive surface 1231 by using any suitable object or accessory, such as a finger or a stylus), and drive a corresponding connection apparatus according to a preset program. In some embodiments, the touch-sensitive surface 1231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1280. Moreover, the touch controller can receive and execute a command sent from the processor 1280. In addition, the touch-sensitive surface 1231 may be a resistive, capacitive, infrared, or surface sound wave type touch-sensitive surface. In addition to the touch-sensitive surface 1231, the input unit 1230 may further include the other input device 1232. In some embodiments, the other input device 1232 may include, but is not limited to, one or more of a physical keyboard, a functional key (such as a volume control key or a switch key), a track ball, a mouse, and a joystick.

The display unit 1240 may be configured to display information input by the user or information provided for the user, and various graphical user interfaces of the printing terminal 1200. The graphical user interfaces may be formed by a graph, a text, an icon, a video, or any combination thereof. The display unit 1240 may include a display panel 1241. In some embodiments, the display panel 1241 may be configured by using a liquid crystal display (LCD), an organic light-emitting diode (OLED), or the like. Further, the touch-sensitive surface 1231 may cover the display panel 1241. After detecting a touch operation on or near the touch-sensitive surface 1231, the touch-sensitive surface 1231 transfers the touch operation to the processor 1280, so as to determine the type of the touch event. Then, the processor 1280 provides a corresponding visual output on the display panel 1241 according to the type of the touch event. Although, in FIG. 12, the touch-sensitive surface 1231 and the display panel 1241 are configured as two separate parts to implement input and output functions, in some embodiments, the touch-sensitive surface 1231 and the display panel 1241 may be integrated to implement the input and output functions.

The printing terminal 1200 may further include at least one sensor 1250, such as an optical sensor, a motion sensor, and other sensors. In some embodiments, the optical sensor may include an ambient light sensor and a proximity sensor. The ambient light sensor can adjust luminance of the display panel 1241 according to brightness of the ambient light. The proximity sensor may switch off the display panel 1241 and/or backlight when the printing terminal 1200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the printing terminal 1200, are not further described herein.

The audio circuit 1260, a loudspeaker 1261, and a microphone 1262 may provide audio interfaces between the user and the printing terminal 1200. The audio circuit 1260 may convert received audio data into an electric signal and transmit the electric signal to the loudspeaker 1261. The loudspeaker 1261 converts the electric signal into a sound signal for output. On the other hand, the microphone 1262 converts a collected sound signal into an electric signal. The audio circuit 1260 receives the electric signal and converts the electric signal into audio data, and outputs the audio data to the processor 1280 for processing. Then, the processor 1280 sends the audio data to, for example, another printing terminal by using the RF circuit 1210, or outputs the audio data to the memory 1220 for further processing. The audio circuit 1260 may further include an earplug jack, so as to provide communication between a peripheral earphone and the printing terminal 1200.

To implement wireless communication, the printing terminal may be configured with a wireless communications unit 1270. The wireless communications unit 1270 may be a WiFi module. WiFi is a short distance wireless transmission technology. The printing terminal 1200 may help, by using the wireless communications unit 1270, the user to receive and send e-mails, browse a webpage, access streaming media, and so on, which provides wireless broadband Internet access for the user. Although FIG. 12 shows the wireless communications unit 1270, it can be understood that the wireless communications unit is not an indispensable component of the printing terminal 1200, and when required, the wireless communications unit may be omitted as long as the scope of the essence of the present invention is not changed.

The processor 1280 is the control center of the printing terminal 1200, and is connected to various parts of the mobile phone by using various interfaces and lines. By running or executing the software program and/or module stored in the memory 1220, and invoking data stored in the memory 1220, the processor 1280 performs various functions and data processing of the printing terminal 1200, thereby performing overall monitoring on the mobile phone. In some embodiments, the processor 1280 may include one or more processing cores. In some embodiments, the processor 1280 may include one or more processing cores. In some embodiments, the processor 1280 may integrate an application processor and a modem. The application processor mainly processes an operating system, a user interface, an application program, and the like. The modem mainly processes wireless communication. It can be understood that the foregoing modem may also not be integrated into the processor 1280.

The printing terminal 1200 further includes the power supply 1290 (such as a battery) for supplying power to the components. In some embodiments, the power supply may be logically connected to the processor 1280 by using a power management system, thereby implementing functions such as charging, discharging and power consumption management by using the power management system. The power supply 1290 may further include one or more of a direct current or alternating current power supply, a recharging system, a power failure detection circuit, a power supply converter or inverter, a power supply state indicator, and any other components.

Although not shown in the figure, the terminal printing terminal 1200 may further include a camera, a Bluetooth module, and the like, which are not further described herein. In some embodiments, the display unit of the printing terminal is a touchscreen display, and the printing terminal further includes a memory and one or more programs. The one or more programs are stored in the memory, and configured to be executed by the one or more processors, to execute instructions that are included in the one or more programs and are used to perform the following operations:

receiving printing data sent by a logistics platform, the printing data including content and a target printing template storage address; downloading a target printing template from a template storage server according to the target printing template storage address, the template storage server being configured to store printing templates; combining the target printing template and the content to generate a printing document; and printing the printing document.

In some embodiments, the memory further includes instructions used to perform the following operation: connecting an installed printing plug-in, and the receiving printing data sent by a logistics platform includes: receiving, by using the connected printing plug-in, the printing data sent by the logistics platform.

In some embodiments, the memory further includes instructions used to perform the following operations: when the printing plug-in is not installed, sending a plug-in download request to the logistics platform; receiving a plug-in installation file, the plug-in installation file being an installation file fed back by the logistics platform in response to the plug-in download request; and installing the printing plug-in by using the plug-in installation file.

In some embodiments, the printing data is generated through encryption by the logistics platform; and before the downloading a corresponding target printing template from a template storage server according to the target printing template storage address, the memory further includes instructions used to perform the following operation: invoking the printing plug-in to decrypt the printing data to obtain the content and the target printing template storage address.

In some embodiments, downloading a target printing template from a template storage server according to the target printing template storage address includes: sending a template request to the template storage server by using the printing plug-in, the template request including the target printing template storage address; and receiving the target printing template fed back by the template storage server in response to the template request, the target printing template being a printing template corresponding to the target printing template storage address.

In some embodiments, the memory further includes instructions used to perform the following operations: receiving a printing query request for the printing document; and feeding back, according to the printing query request, a printing result of the printing document.

In some embodiments, the target printing template is configured for determining a style of the printing document to determine printing positions of the content. The printing plug-in is configured to combine the target printing template and the content to form the corresponding printing document.

Embodiments of the specification further provides a non-volatile readable storage medium. The storage medium stores one or more modules (programs). The one or more modules may enable, when being applied to a terminal device, the terminal device to execute (instructions) of the steps of the methods in the embodiments of the specification.

Figure 13A:
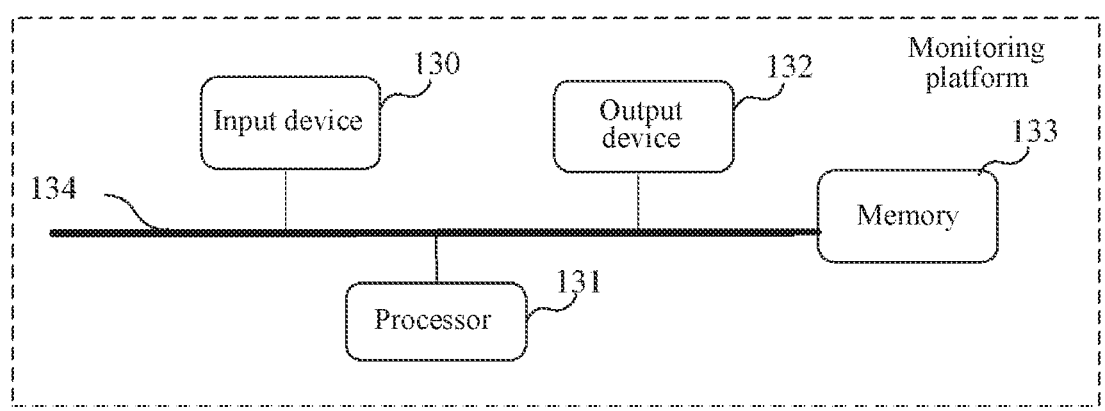
FIG. 13A is a schematic diagram of a hardware structure of a logistics platform according to some embodiments of the specification.

FIG. 13A is a schematic diagram of a hardware structure of a logistics platform according to some embodiments of the specification. As shown in FIG. 13, the logistics platform may include an input device 130, a processor 131, an output device 132, a memory 133, and at least one communications bus 134. The communications bus 134 is configured to implement communication connection between components. The memory 133 may include a high-speed RAM memory or may further include an NVM, for example, at least one magnetic disk memory. The memory 133 may store various programs for accomplishing various processing functions and implementing the method steps performed by the logistics platform.

In some embodiments, the processor 131 may be implemented as, for example, a central processing unit (CPU), an application-specific integrated circuit (ASIC), a digital signal processor (DSP), a digital signal processing device (DSPD), a programmable logic device (PLD), a field-programmable gate array (FPGA), a controller, a microcontroller, a microprocessor or another electronic component. The processor 131 is coupled to the input device 130 and the output device 132 through a wired or wireless connection.

In some embodiments, the input device 130 may include various input devices. For example, the input device 130 may include at least one of a user-oriented user interface, a device-oriented device interface, a software programmable interface, a camera, and a sensor. In some embodiments, the device-oriented device interface may be a wired interface for performing device-to-device data transmissions, or may be a hardware insertion interface (for example, a USB interface or a serial port) for performing device-to-device data transmissions. In some embodiments, the user-oriented user interface may be, for example, user-oriented control keys, a speech input device configured to receive speech input, or a touch perceiving device (for example, a touchscreen, a touchpad having a touch-sensing function) configured to receive touch input of a user. In some embodiments, the software programmable interface may be, for example, a portal, for example, a chip input pin interface or an output interface, through which the user edits or modifies the program. In some embodiments, the transceiver may be a radio frequency transceiver chip, a baseband processing chip, a transceiver antenna or the like having a communication function. A microphone or other audio input devices may receive speech data. The output device 132 may include a display, audio equipment, and other output devices.

In some embodiments, a processor of the logistics platform includes functions of implementing the modules of the foregoing print processing device applied to the logistics platform. For functions and technical effects, refer to the foregoing embodiments. Details are not described herein again.

Figure 13B:
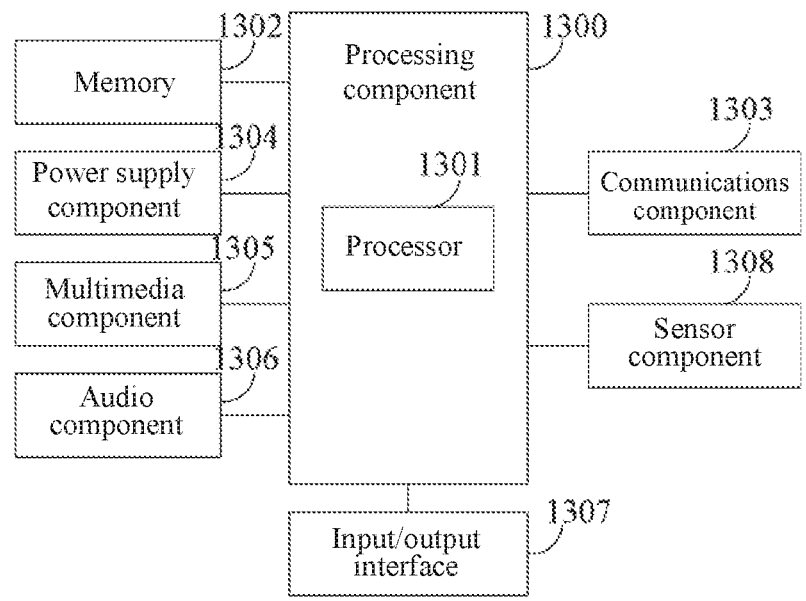
FIG. 13B is a schematic diagram of a hardware structure of a logistics platform according to other embodiments of the specification.

FIG. 13B is a schematic diagram of a hardware structure of a logistics platform according to other embodiments of the specification. FIG. 13B shows embodiments of FIG. 13A during implementation. As shown in FIG. 13B, the logistics platform includes a processor 1301 and a memory 1302.

The processor 1301 executes computer program code stored in the memory 1302 to implement the print processing method of the logistics platform in FIG. 1 to FIG. 8 in the foregoing embodiments.

The memory 1302 is configured to store various types of data to support operations on the logistics platform. Examples of the data include any application or method instructions, such as messages, pictures, and videos for the operations on the logistics platform. The memory 1302 may include a random-access memory (RAM) or may include an NVM, for example, at least one magnetic disk memory.

In some embodiments, the processor 1301 is arranged in the processing component 1300. The logistics platform may further include a communications component 1303, a power supply component 1304, a multimedia component 1305, an audio component 1306, an input/output interface 1307 and/or a sensor component 1308. The components and the like that are included in the logistics platform are arranged according to actual requirements. This is not limited in this embodiment.

The processing component 1300 usually controls the overall operations of the logistics platform. The processing component 1300 may include one or more processors 1301 for executing instructions to complete all or some of the steps in the foregoing methods in FIG. 1 to FIG. 5. In addition, the processing component 1300 may include one or more modules to facilitate interaction between the processing component 1300 and other components. For example, the processing component 1300 may include a multimedia module to facilitate interaction between the multimedia component 1305 and the processing component 1300.

The power supply component 1304 provides electric power to the various components of the logistics platform. The power supply component 1304 may include a power supply management system, one or more power supplies, and other components related to generating, managing, and distributing electric power to the logistics platform.

The multimedia component 1305 includes an output interface display screen provided between the logistics platform and a user. In some embodiments, the display screen may include a liquid crystal display (LCD) or a TP. If the display screen includes a TP, the display screen may be implemented as a touchscreen to receive input signals from the user. The TP includes one or more touch sensors to detect touches, swipes, and gestures on the TP. The touch sensor may detect the boundaries of touch or swipe actions and may measure duration and pressure related to touch or swipe operations.

The audio component 1306 is configured to output and/or input audio signals. For example, the audio component 1306 includes a microphone (MIC). When the logistics platform is in an operating mode, for example, a speech recognition mode, the microphone is configured to receive external audio signals. The received audio signals may be further stored in the memory 1302 or sent via the communications component 1303. In some embodiments, the audio component 1306 further includes a loudspeaker configured to output an audio signal.

The input/output interface 1307 provides an interface between the processing component 1300 and peripheral interface modules. The peripheral interface modules may be click wheels, buttons, and the like. These buttons may include, but are not limited to, a volume button, a start button, and a lock button.

The sensor component 1308 includes one or more sensors and is configured to provide status evaluations of various aspects of the logistics platform. For example, the sensor component 1308 may detect the on/off state of the logistics platform, the relative position of the component, and the presence or absence of contact between the user and the logistics platform. The sensor component 1308 may include a proximity sensor configured to detect the presence of a nearby object when there is no physical contact, including the measurement of distance between the user and the logistics platform. In some embodiments, the sensor component 1308 may further include a camera and the like.

The communications component 1303 is configured to facilitate wired or wireless communication between the logistics platform and other devices. The logistics platform may access a wireless network based on a communications standard such as WiFi, 2G, 3G or combinations thereof. In some embodiments, the logistics platform may include a SIM card slot. The SIM card slot is for inserting a SIM card, so that the logistics platform may register with a GPRS network and establish communication between the Internet and servers.

As may be seen from above, the communications component 1303, the audio component 1306, the input/output interface 1307, and the sensor component 1308 that are used in the embodiments in FIG. 13B may all be implemented as the input device in the embodiments in FIG. 13A.

The logistics platform includes a processor and a display, where the display is coupled to the processor. The processor is configured to: provide one or more printing templates, a template identifier associated with each of the printing templates, and a printing template storage address and a printing terminal ID that are associated with the template identifier; when printing information sent by a transaction server is received, determine content and a target template identifier according to the printing information; determine a target printing terminal and a target printing template storage address according to the target template identifier; generate printing data according to the content and the target printing template storage address; and send the printing data to the target printing terminal.

Figure 14:
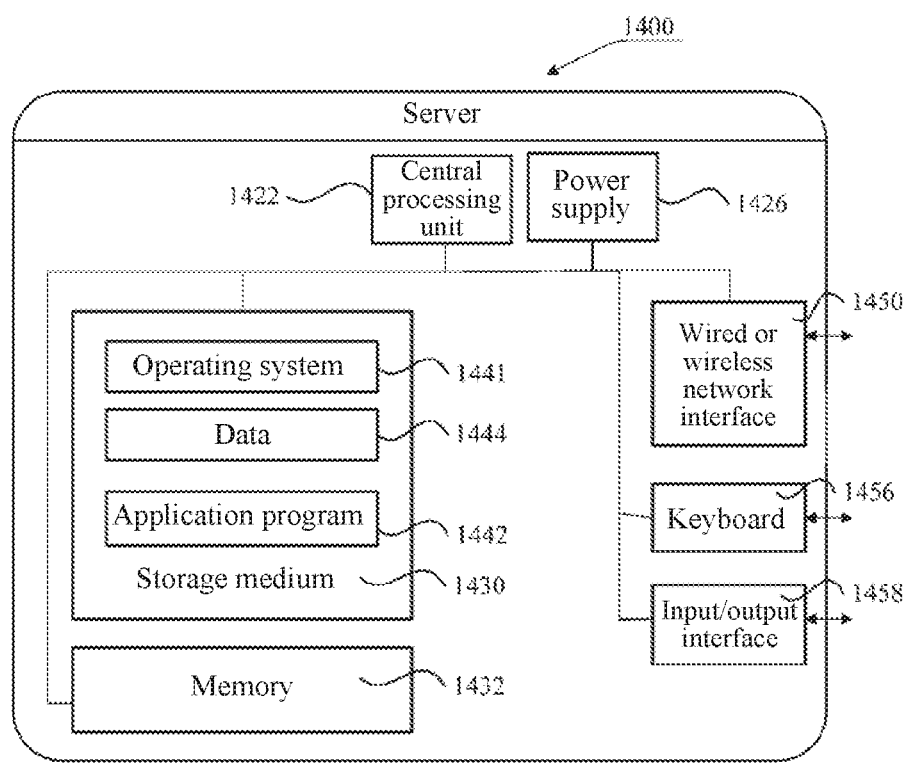
FIG. 14 is a schematic structural diagram of a transaction server according to some embodiments of the specification.

FIG. 14 is a schematic structural diagram of a transaction server according to some embodiments of the specification. As shown in FIG. 14, the server 1400 may be configured to implement the print processing method of the transaction server provided in the foregoing embodiments. The server 1400 may vary due to different configuration or performance, and may include one or more CPUs 1422 (for example, one or more processors), a memory 1432, and one or more storage media 1430 (for example, one or more mass storage devices) that stores application programs 1442 or data 1444. The memory 1432 and the storage medium 1430 may be used for transient storage or permanent storage. A program stored in the storage medium 1430 may include one or more modules (which are not shown in the figure), and each module may include a series of instruction operations on the server. Furthermore, the CPU 1422 may be set to communicate with the storage medium 1430, and perform, on the server 1400, the series of instruction operations in the storage medium 1430.

The server 1400 may further include one or more power supplies 1426, one or more wired or wireless network interfaces 1450, one or more input/output interfaces 1458, one or more keyboards 1456, and/or, one or more operating systems 1441, for example, Windows Server™, Mac OS X™, Unix™, Linux™, and FreeBSD™. The CPU 1422 may execute the instructions of the following operations on the server 1400: when target business information is detected, determining printing information corresponding to the target business information, the printing information being configured to determine content to be printed and a target template identifier, and the target template identifier being configured to determine a target printing template storage address and a target printing terminal; and sending the printing information to a logistics platform, to trigger the logistics platform to send printing data to the target printing terminal, the printing data being data being generated according to the content and the target printing template storage address, the target printing terminal being configured to print a printing document, and the printing document being obtained by combining a target printing template and the content.

In some embodiments, the target printing template is configured for determining a style of the printing document to determine printing positions of the content.

The embodiments in this specification are all described in a progressive manner. Description of each of the embodiments focuses on differences from other embodiments, and reference may be made to each other for the same or similar parts among respective embodiments.

A person skilled in the art should understand that the embodiments of the specification may be provided as a method, a device, or a computer program product. Therefore, the embodiments of the specification may use a form of a complete hardware embodiment, a complete software embodiment, or an embodiment combining software and hardware. In addition, the specification may use a form of a computer program product implemented on one or more computer available storage media (including but not limited to a disk memory, a CD-ROM, and an optical memory) including computer available program code.

The embodiments of the specification are described with reference to flowcharts and/or block diagrams of the method, terminal device (system), and the computer program product in the embodiments of the specification. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing terminal device to generate a machine, so that an apparatus configured to implement functions specified in one or more processes in the flowcharts and/or one or more blocks in the block diagrams is generated by using instructions executed by the general-purpose computer or the processor of the another programmable data processing terminal device.

These computer program instructions may also be stored in a computer readable memory that can guide a computer or another programmable data processing terminal device to work in a manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing terminal device, so that a series of operation steps are performed on the computer or another programmable data processing terminal device to generate processing implemented by a computer, and instructions executed on the computer or another programmable data processing terminal device provide steps for implementing functions specified in one or more processes in the flowcharts and/or one or more blocks in the block diagrams.

Although some embodiments of the specification are described, once acquiring basic innovative concepts a person skilled in the art can make other changes and modifications to these embodiments. Therefore, the appended claims intend to be explained to include embodiments and all changes and modifications that fall within scope of the embodiments of the specification.

Finally, it should further be noted that the relational terms such as first and second are used only to differentiate an entity or operation from another entity or operation, and do not require or imply any actual relationship or sequence between these entities or operations. Moreover, the terms "include," "comprise," and any variants thereof are intended to cover a non-exclusive inclusion. Therefore, in the context of a process, a method, an object, or a terminal device that includes a series of elements, the process, method, object, or terminal device not only includes such elements, but also includes other elements not specified expressly, or may include inherent elements of the process, method, object, or terminal device. Unless otherwise specified, an element limited by "include a/an . . . " does not exclude other same elements existing in the process, method, object, or terminal device that includes the element.

The print processing method, the print processing device, the printing terminal, the logistics platform, and the server provided in the specification are described in detail above. The principle and implementation of the specification are described through examples. The description about the embodiments of the specification is merely provided for ease of understanding of the methods and core ideas of the specification. A person of ordinary skill in the art can make variations and modifications to the specification in terms of the implementations and application scope according to the ideas of the specification. Therefore, the embodiments of the specification shall not be construed as a limit to the application.

What is claimed is:

1. A computer-implemented printing method, comprising:
receiving printing data comprising to-be-printed content and a storage address of a target printing template;
downloading the target printing template according to the storage address of the target printing template, the downloading comprising:
sending a template request to a template storage server by using a printing plug-in, the template request including the storage address of the target printing template; and
receiving the target printing template corresponding to the storage address from the template storage server in response to the template request;
combining the target printing template and the to-be-printed content to generate a printing document; and
printing the printing document.

2. The method according to claim 1, further comprising:
sending a download request for the printing plug-in to a logistics platform;
receiving a plug-in installation file from the logistics platform; and
installing the printing plug-in by using the plug-in installation file.

3. The method according to claim 1, further comprising:
connecting the printing plug-in; and
wherein receiving printing data comprises: receiving the printing data from a logistics platform by using the connected printing plug-in.

4. The method according to claim 3, wherein the printing data is encrypted by the logistics platform; and
before downloading the target printing template according to the storage address of the target printing template, the method further comprises: invoking the printing plug-in to decrypt the printing data to obtain the to-be-printed content and storage address of the target printing template.

5. The method according to claim 3, wherein the printing plug-in is configured to combine the target printing template and the to-be-printed content to form the printing document.

6. The method according to claim 1, further comprising:
receiving a printing query request with respect to the printing document; and
sending, in response to the printing query request, a printing result with respect to the printing document.

7. The method according to claim 1, wherein the target printing template is configured to determine a style of the printing document to determine printing positions corresponding to the to-be-printed content.

8. A computer-implemented printing method, comprising:
generating a printing template and a template identifier according to a template style document uploaded by a printing terminal;
uploading the printing template to a template storage server for storage, and determining a storage address of the printing template;
providing one or more printing templates, a template identifier associated with each of the one or more printing templates, and a printing template storage address and a printing terminal identification (ID) that are associated with the template identifier;
in response to receiving printing information, determining to-be-printed content and a target template identifier according to the printing information;
determining a target printing terminal and a storage address of a target printing template according to the target template identifier;
generating printing data according to the to-be-printed content and the storage address of the target printing template; and
sending the printing data to the target printing terminal.

9. The method according to claim 8, further comprising:
receiving a download request for a printing plug-in from the target printing terminal;
sending a plug-in installation file for installation of the printing plug-in to the target printing terminal in response to the download request.

10. The method according to claim 9, wherein the printing plug-in is configured to combine the target printing template and the to-be-printed content to form a printing document.

11. The method according to claim 9, wherein generating printing data according to the to-be-printed content and the storage address of the target printing template comprises:
encrypting the to-be-printed content and the target printing template storage address according to an encryption protocol of the printing plug-in to generate the printing data.

12. The method according to claim 8, wherein a format of the template style document comprises an office software document format.

13. The method according to claim 8, wherein the target printing template is configured to determine a style of a printing document to determine printing positions corresponding to the to-be-printed content.

14. A print processing apparatus, comprising: one or more processors and one or more non-transitory computer-readable memories coupled to the one or more processors and configured with instructions executable by the one or more processors to cause the system to perform operations comprising:
receiving printing data comprising to-be-printed content and a storage address of a target printing template;
downloading the target printing template according to the storage address of the target printing template, the downloading comprising:
sending a template request to a template storage server by using a printing plug-in, the template request including the storage address of the target printing template; and
receiving the target printing template corresponding to the storage address from the template storage server in response to the template request;
combining the target printing template and the to-be-printed content to generate a printing document; and
printing the printing document.

15. The apparatus according to claim 14, wherein the operations further comprise:
sending a download request for the printing plug-in to a logistics platform;
receiving a plug-in installation file from the logistics platform; and
installing the printing plug-in by using the plug-in installation file.

16. The apparatus according to claim 14, wherein the operations further comprises:
connecting the printing plug-in; and
wherein receiving printing data comprises: receiving the printing data from a logistics platform by using the connected printing plug-in.

17. The apparatus according to claim 16, wherein printing data is encrypted by the logistics platform; and
before downloading the target printing template according to the storage address of the target printing template, the operations further comprise: invoking the printing plug-in to decrypt the printing data to obtain the to-be-printed content and storage address of the target printing template.

* * * * *